(12) United States Patent
Luo (10) Patent No.: US 7,817,351 B2
(45) Date of Patent: Oct. 19, 2010

(54) ZOOM LENS SYSTEM

(75) Inventor: Yang-Cheng Luo, Guangdong (CN)

(73) Assignees: Premier Image Technology (China) Ltd., Foshan, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 149 days.

(21) Appl. No.: 12/346,797

(22) Filed: Dec. 30, 2008

(65) Prior Publication Data
US 2010/0157439 A1 Jun. 24, 2010

(30) Foreign Application Priority Data
Dec. 20, 2008 (CN) .................. 2008 1 0306410

(51) Int. Cl.
*G02B 15/14* (2006.01)
(52) U.S. Cl. ....................... 359/689; 359/682
(58) Field of Classification Search .............. 359/689, 359/680–682
See application file for complete search history.

(56) References Cited

U.S. PATENT DOCUMENTS

| 6,785,057 | B2 * | 8/2004 | Ori | 359/689 |
| 7,492,527 | B2 * | 2/2009 | Tomioka | 359/689 |
| 2007/0053072 | A1 * | 3/2007 | Nanba | 359/689 |

* cited by examiner

*Primary Examiner*—Jordan M. Schwartz
(74) *Attorney, Agent, or Firm*—Zhigang Ma (57) ABSTRACT

A zoom lens system includes, in order from the object side, a negative first lens group, a positive second lens group; and a positive third lens group. The first lens group includes, in order from the object side to the image side, a negative first lens and a positive second lens. The second lens group includes, in order from the object side to the image side, a positive third lens, a negative fourth lens, and a negative fifth lens. The zoom lens system satisfies certain conditions related to the configuration of the lens and lens groups of the zoom lens system in order to provide a compact zoom lens having excellent correction of aberrations.

20 Claims, 10 Drawing Sheets

ZOOM LENS SYSTEM

TECHNICAL FIELD

The present disclosure relates to lens systems and, particularly, to a compact zoom lens system having a small number of lens components and short overall length.

DESCRIPTION OF THE RELATED ART

Conventionally, there is a technical field of lenses where a short overall length is demanded for use in lens modules for image acquisition that are mounted in relatively compact equipment, such as simple digital cameras, webcams for personal computers, and portable imaging systems in general. In order to satisfy this demand, conventional imaging lenses have been formed using a one-piece lens construction. Until now, the electronic image sensing chips used with the lens modules have been compact and have low resolution, maintaining a small image size on the image sensing chips and miniaturizing the lens systems with a small number of lens components. In those arrangements, although using one-piece lens construction, aberrations have been at an acceptable level because the incident angle of light rays onto the image sensing chip is usually not so wide as to let the aberrations be noticeable.

However, nowadays, because the resolution and the size of the image sensing chips have increased, aberrations occurring in one-piece lenses are now too noticeable to be used with the improved images sensing chips. Therefore, it is necessary to develop a lens system with a short overall length and an optical performance that matches image sensing chips with enhanced resolution and size.

What is needed, therefore, is a zoom lens system with a short overall length and with relatively good optical performance.

BRIEF DESCRIPTION OF THE DRAWINGS

Many aspects of the present zoom lens system can be better understood with reference to the following drawings. The components in the drawings are not necessarily drawn to scale, the emphasis instead being placed upon clearly illustrating the principles of the present zoom lens system. Moreover, in the drawings, like reference numerals designate corresponding parts throughout the several views.

DETAILED DESCRIPTION OF THE EMBODIMENTS

Embodiments of the present disclosure will now be described in detail below, with reference to the accompanying drawings.

Figure 1:
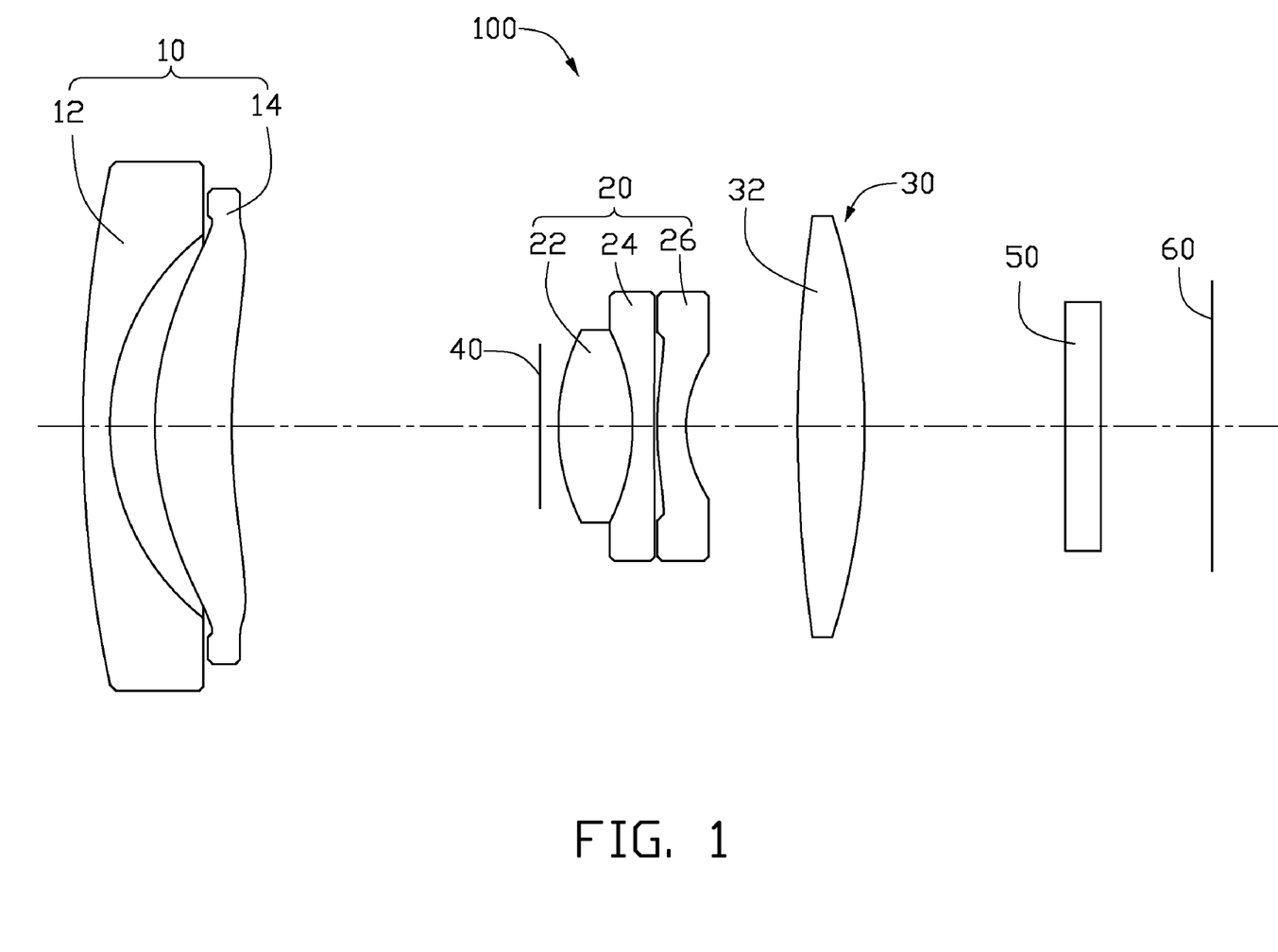
FIG. 1 is a schematic view of a zoom lens system at a wide-angle position according to an embodiment.
Figure 2:
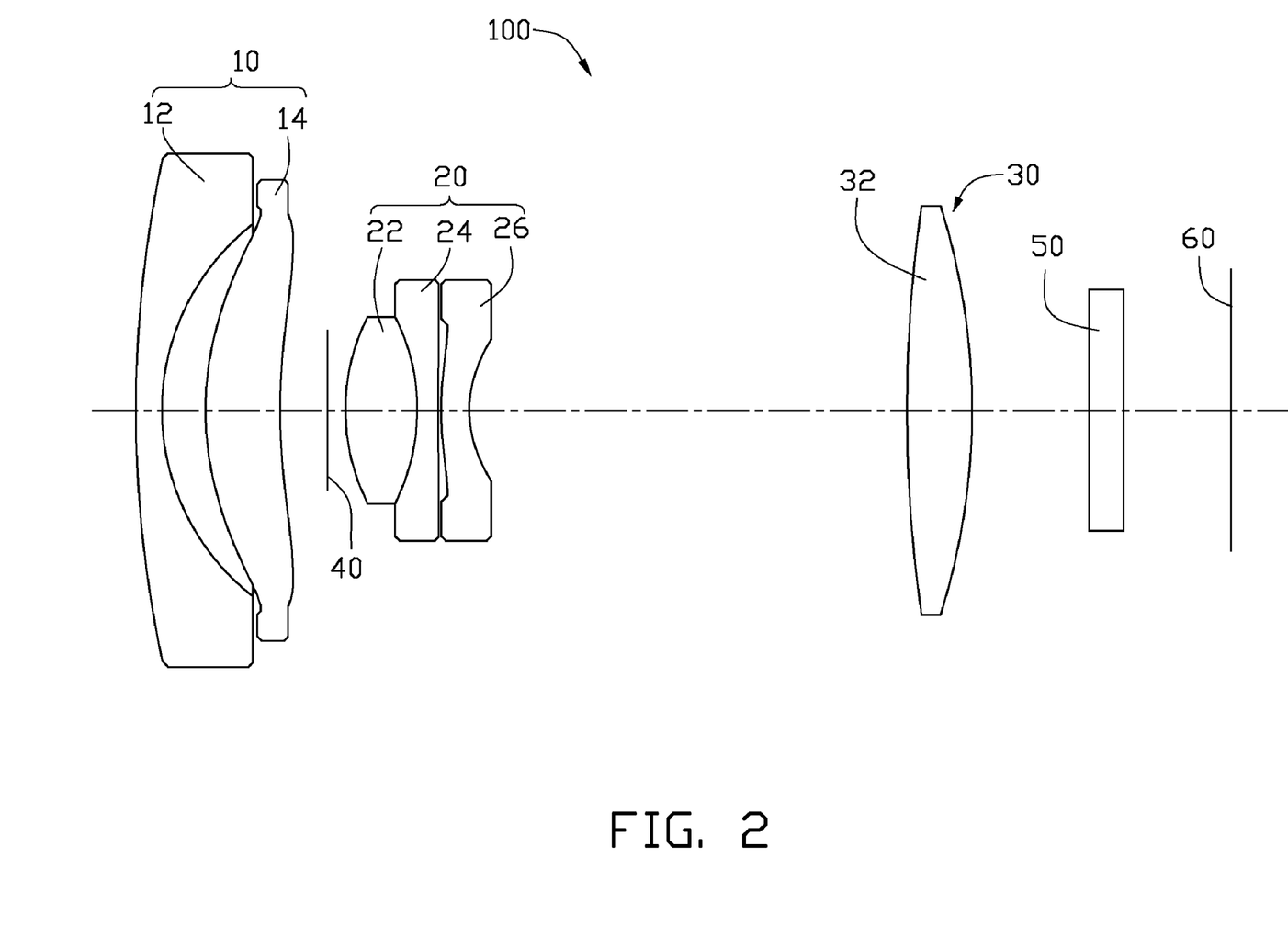
FIG. 2 is a schematic view of the zoom lens system of FIG. 1 at a telephoto position.
Figure 3:
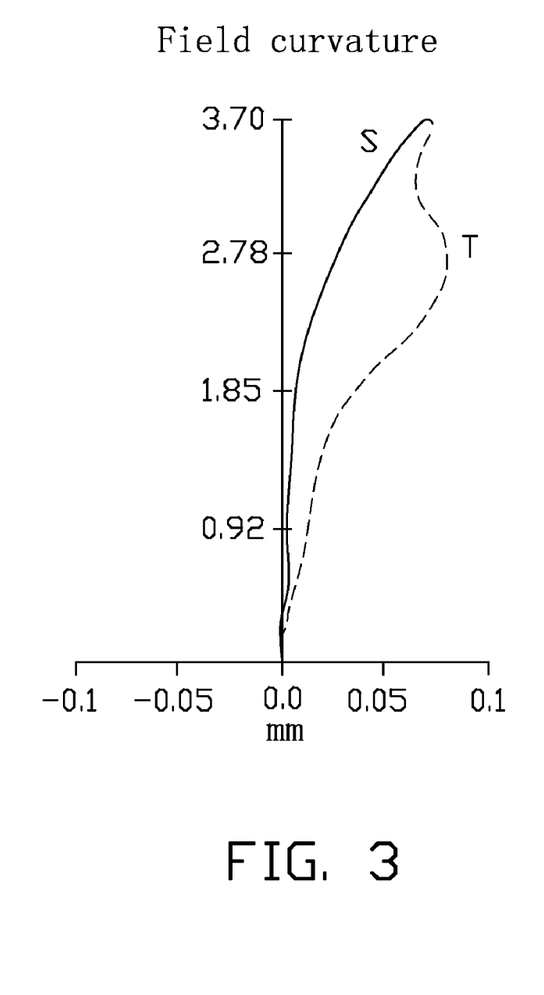
FIGS. 3-6 are graphs respectively showing field curvature, distortion, chromatic aberration, and spherical aberration of the zoom lens system of FIG. 1 at a wide-angle position according to an example.
Figure 4:
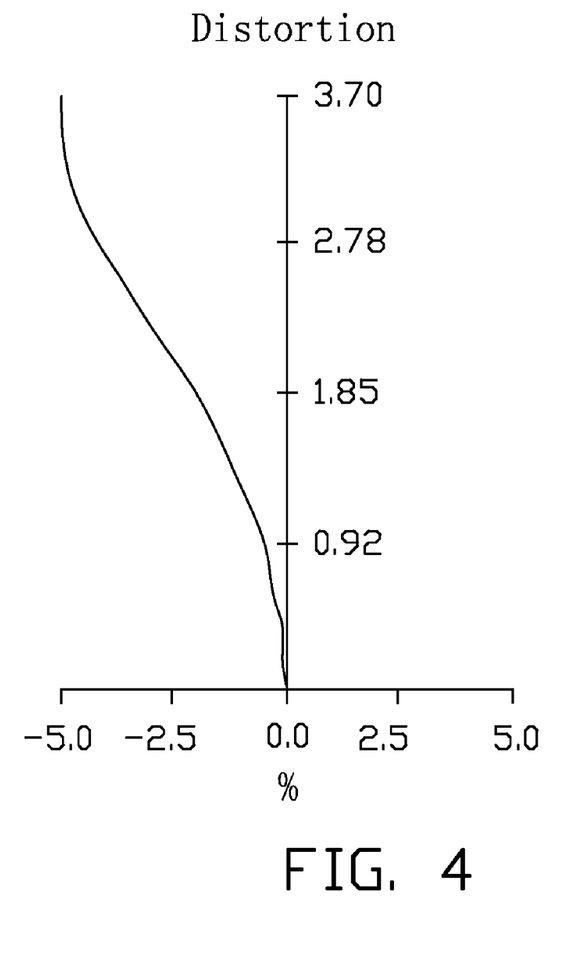

Referring to FIGS. 1 and 2, a zoom lens system 100 for an image capturing device, according to an embodiment, is shown. The zoom lens system 100 includes, in order from the object side to the image side, a first lens group 10 having negative refractive power, a second lens group 20 having positive refractive power, and a third lens group 30 having positive refractive power. The image capturing device can be a digital camera, a mobile phone, a personal computer camera and so on. The zoom lens system 100 can be used for capturing images by disposing an image sensor at an image plane 60 of the zoom lens system 100.

The first lens group 10 includes, in order from the object side to the image side, a first lens 12 having negative refractive power and a second lens 14 having positive refractive power. The second lens group 20 includes, in order from the object side to the image side, a third lens 22 having positive refractive power, a fourth lens 24 having negative refractive power, and a fifth lens 26 having negative refractive power. In the present embodiment, the third lens 22 and the fourth lens 24 are cemented to form a cemented lens. The third lens group 30 includes a sixth lens 32 having positive refractive power.

The zoom lens system 100 further includes an aperture stop 40 and an infrared filter 50. The aperture stop 40 is arranged between the first lens group 10 and the second lens group 20 in order to reduce light flux into the second lens group 20. For cost reduction, the aperture stop 40 may be formed directly on the surface of the third lens 22 of the second lens group 20 facing the object side of the zoom lens system 100. In practice, a peripheral portion of the surface of the third lens 22 through which light rays should not be transmitted is coated with an opaque material, which functions as the aperture stop 40. The infrared filter 50 is arranged between the third lens group 30 and the image plane 60 for filtering infrared rays coming into the zoom lens system 100.

The zoom lens system 100 can zoom between a wide-angle position and a telephoto position by changing the distance between the first lens group 10 and the second lens group 20 along the optical axis of the zoom lens system 100. The third lens group 30 can be moved along the optical axis for focusing the zoom lens system 100. In the present embodiment, the aperture stop 40 is fixed relative to the second lens group 20 to be moved together with the second lens group 20.

In order that the zoom lens system 100 has a short overall length and good optical performance, the zoom lens system 100 satisfies the following conditions:

$$ND3 > 1.8; \tag{1}$$

$$(ND3 - ND4) < 0.1; \tag{2}$$

$$TTL/fw \leq 1.3; \text{ and} \tag{3}$$

$$R6/fw > 0.70, \tag{4}$$

wherein, ND3 is the refractive index of the third lens 22, ND4 is the refractive index of the fourth lens 24, TTL is the sum of the thickness of the first lens group 10, the thickness of the second lens group 20, and the thickness of the third lens group 30, fw is a focal length of the zoom lens system 100 at the wide-angle position, R6 is the radius of curvature of a surface of the third lens 22 facing the object side of the zoom lens system 100.

The first condition (1) together with the second condition (2) are configured for decreasing the curvature of the third lens 22 and the fourth lens 24 by limiting the refractive index of the third lens 22 and the fourth lens 24. The third condition (3) is configured for limiting the overall length of the zoom lens system 100 by providing the relationship between the TTL and the focal length of the zoom lens system 100 at the wide-angle position. The fourth condition (4) is configured for decreasing spherical aberration and coma of the zoom lens system 100 by limiting the structure of the third lens 22 and providing the relationship between the focal length of the zoom lens system 100 at the wide-angle position and the structure of the third lens 22.

The third lens 22 and the fourth lens 24 also satisfies the following condition:

$$10.5 < (V3 - V4) < 11, \quad (5)$$

wherein, V3 is the Abbe constant of the third lens 22, V4 is the Abbe constant of the fourth lens 24. The third condition (5) is for ensuring the light from an object has low chromatic aberration after transmitting through the third lens 22 and the fourth lens 24 to decrease the chromatic aberration of the zoom lens system 100.

Furthermore, in the present embodiment, the first lens 12, the third lens 22, the fourth lens 24, and the sixth lens 32 are made from glass. The second lens 14 and the fifth lens 26 are made from resin or plastic and each surface of the second lens 14 and the fifth lens 26 is aspheric. Because the first lens 12, the third lens 22, the fourth lens 24, and the sixth lens 32 are made from glass, the chromatic aberration of the zoom lens system 100 can be decreased. Because the second lens 14 and the fifth lens 26 are made from resin or plastic, the manufacture cost of the zoom lens system 100 can be decrease. And because each surface of the second lens 14 and the fifth lens 26 is aspheric, the optical performance of the zoom lens system 100 can be improved. Therefore, the zoom lens system 100 can have relative low chromatic aberration, relative low cost and good optical performance.

Examples of the system will be described below with reference to FIGS. 3-10. It is to be understood that the disclosure is not limited to these examples. The following are symbols used in each exemplary embodiment.

R: radius of curvature;
d: distance between surfaces on the optical axis of the zoom lens system 100;
nd: refractive index of lens;
V: Abbe constant;
FNo: F number;
2ω: field angle;
f: focal length of the zoom lens system 100;
d4: a distance from a surface of the second lens 14 facing the image side of the zoom lens system 100 to a surface of the third lens 22 facing the object side of the zoom lens system 100; and
d10: a distance from a surface of the fifth lens 26 facing the image side of the zoom lens system 100 to a surface of the sixth lens 32 facing the object side of the zoom lens system 100.

In the example, both surfaces of the second lens 14 and both surfaces of the fifth lens 26 are aspheric. The zoom lens system 100 satisfies the following condition: f=6.36~18.02 mm; FNo=3.09~5.8; 2ω=23.46°~63.24°. The shape of each aspheric surface is determined by expression 1 below. Expression 1 is based on a Cartesian coordinate system, with the vertex of the surface being the origin, and the optical axis extending from the vertex being the x-axis.

Expression 1:

$$x = \frac{ch^2}{1 + \sqrt{1 - (k+1)c^2h^2}} + \sum A_i h^i$$

wherein, h is a height from the optical axis to the surface, c is a vertex curvature, k is a conic constant, and Ai are i-th order correction coefficients of the aspheric surfaces.

Tables 1 to 3 show lens data of the Example. Table 2 lists the value of the constant k and aspherical coefficients A4-A10 used in the Expression 1 above for each aspheric surface of the second lens 14 and the fifth lens 26. An "E" in the data indicates that the number following the "E" is the exponent to the base 10. For example, "1.0E-2" represents the number $1.0 \times 10^{-2}$.

TABLE 1

| Zoom lens system 100 | R(mm) | d(mm) | nd | V |
|---|---|---|---|---|
| Object side surface of the first lens 12 | 27.6967 | 0.6 | 1.72 | 50.34 |
| Image side surface of the first lens 12 | 5.4255 | 1 | — | — |
| Object side surface of the second lens 14 | 7.1295 | 1.72 | 1.60727 | 26.64 |
| Image side surface of the second lens 14 | 14.0636 | D4(Variable) | — | — |
| Stop 40 | infinite | 0.4 | — | — |
| Object side surface of the third lens 22 | 4.7600 | 1.66 | 1.883 | 40.79 |
| Object side surface of the fourth lens 24 | −4.7600 | 0.48 | 1.85013 | 30.06 |
| Image side surface of the fourth lens 24 | 242.4692 | 0.06 | — | — |
| Object side surface of the fifth lens 26 | 6.2799 | 0.65 | 1.60727 | 26.64 |
| Image side surface of the fifth lens 26 | 2.4800 | D10(Variable) | — | — |
| Object side surface of the sixth lens 32 | 33.4740 | 1.5 | 1.6968 | 55.53 |
| Image side surface of the sixth lens 32 | −15.6467 | 0.6 | — | — |
| Object side surface of the infrared filter 50 | infinite | 0.8 | 1.5872 | 64.2 |
| Image side surface of the infrared filter 50 | infinite | 0 | — | — |

TABLE 2

| Surface | Aspherical coefficients |
|---|---|
| Object side surface of the second lens 14 | k = 4.489962E−01; A4 = 0.000000E+00; A6 = −5.167526E−04; A8 = −1.829545E−05; A10 = −1.430987E−06; A12 = 2.158263E−07; A14 = −8.306842E−09; |
| Image side surface of the second lens 14 | k = 1.816239E+00; A4 = 0.000000E+00; A6 = −7.877470E−04; A8 = −5.301337E−05; A10 = 4.564293E−06; A12 = −1.771874E−07; A14 = 1.033070E−10; |
| Object side surface of the fifth lens 26 | k = −3.474839E+01; A4 = 0.000000E+00; A6 = 3.310405E−03; A8 = −2.872711E−03; A10 = 3.693752E−04; A12 = 9.375498E−05; A14 = −2.480704E−05; |
| Image side surface of the fifth lens 26 | k = −2.006475E−01; A4 = 0.000000E+00; A6 = −1.363198E−02; A8 = 8.833228E−04; A10 = −6.186488E−05; A12 = 4.059796E−05; A14 = −1.449780E−05; |

TABLE 3

| Variable distance | wide-angle position | telephoto position |
|---|---|---|
| D4 | 11.08 | 1.1 |
| D10 | 3.93 | 15.7 |

Figure 5:
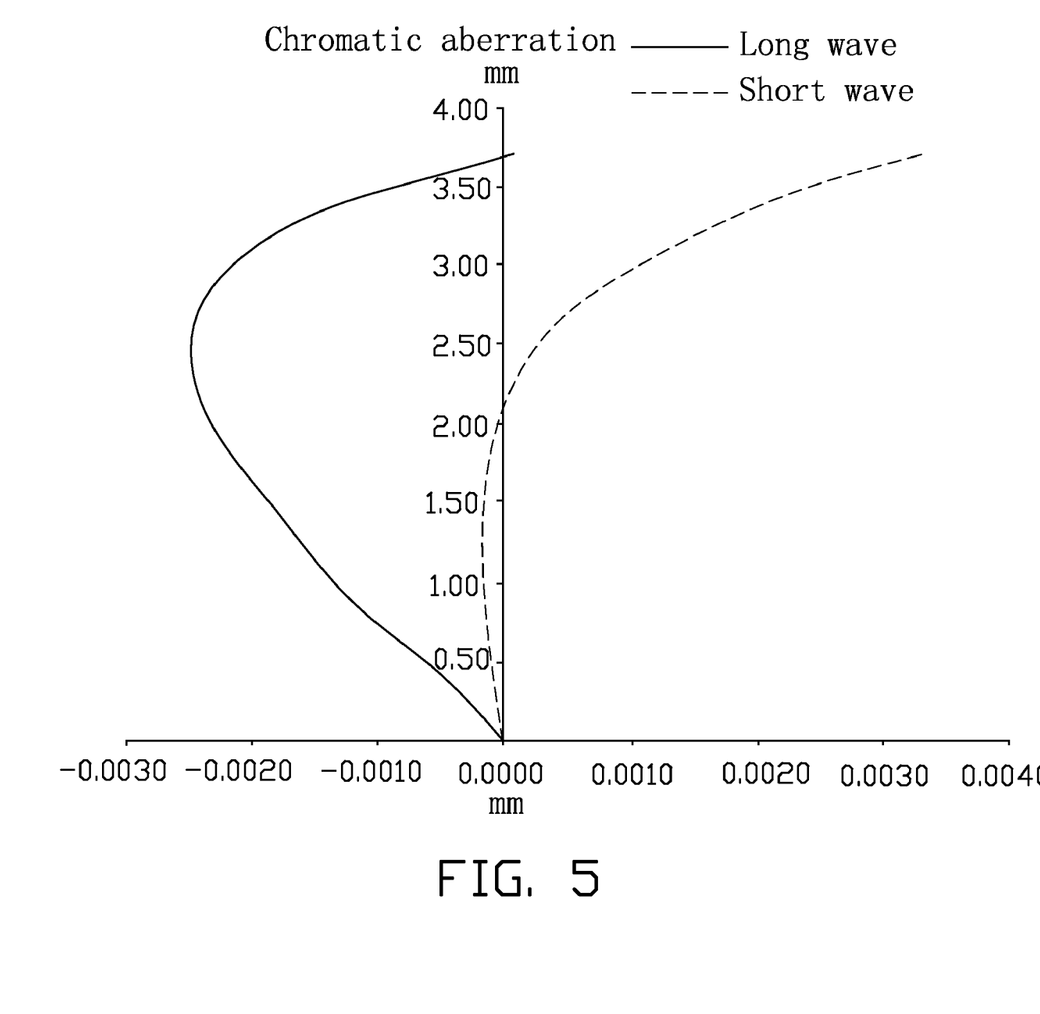
Figure 6:
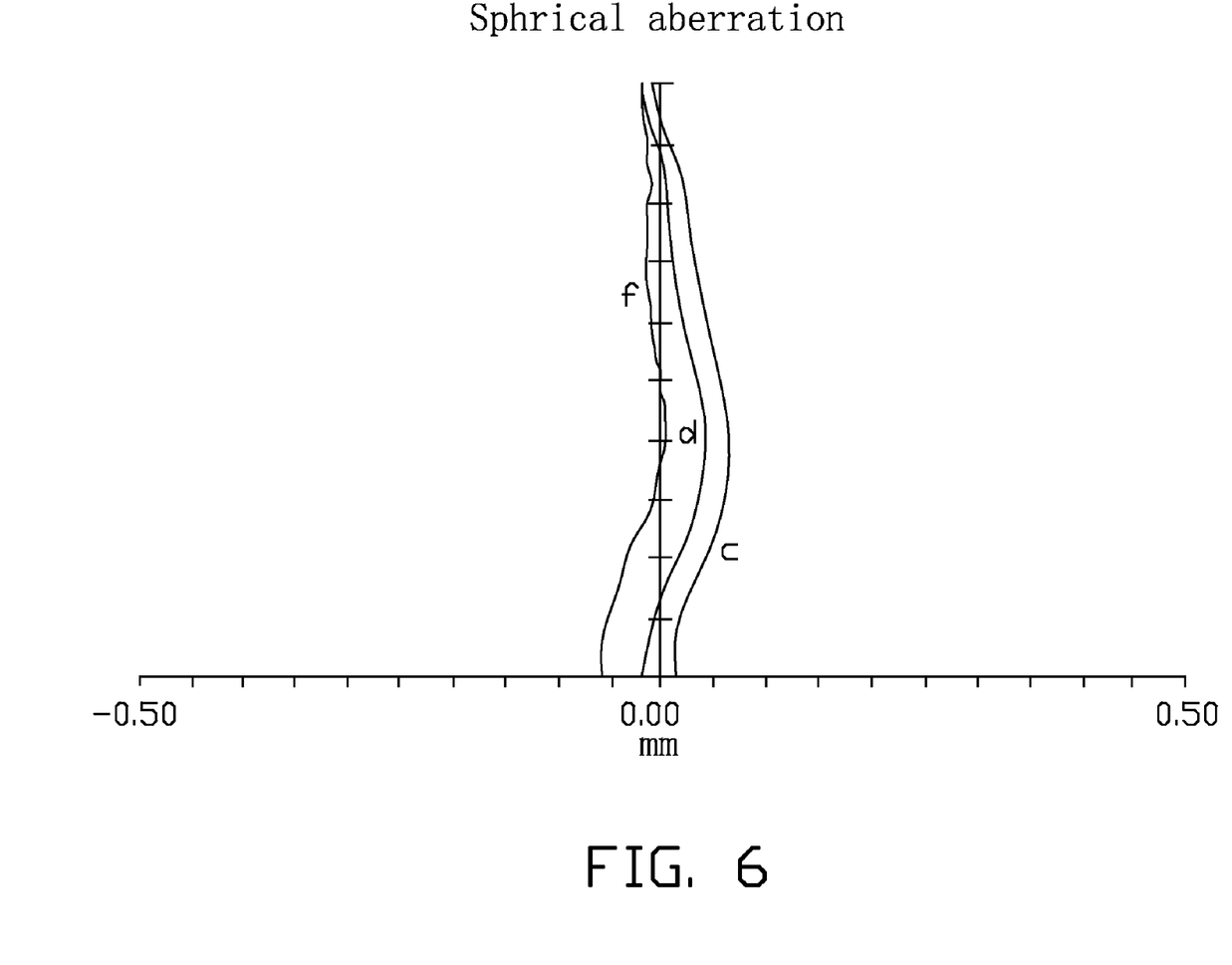
Figure 7:
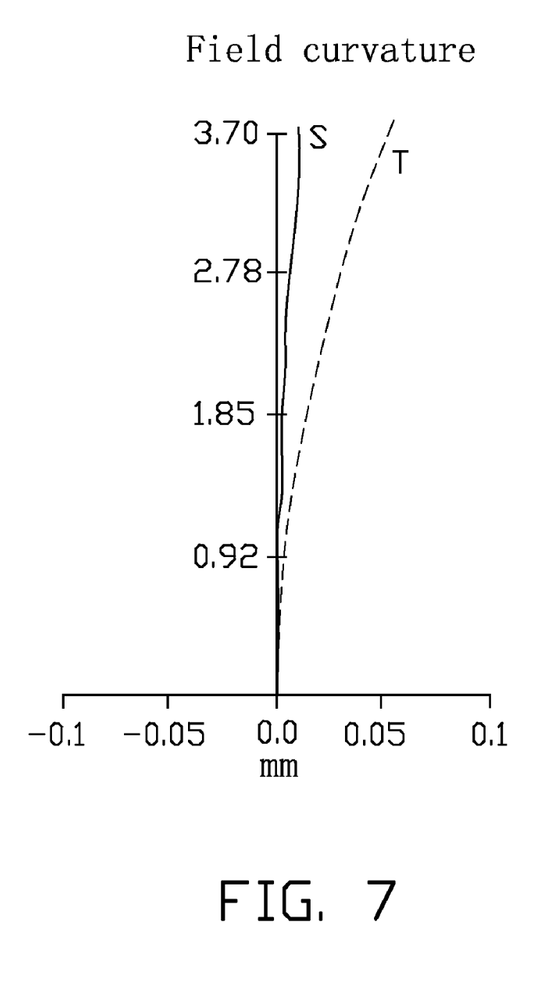
FIGS. 7-10 are graphs respectively showing field curvature, distortion, chromatic aberration, and spherical aberration of the zoom lens system of FIG. 1 at a telephoto position according to an example.
Figure 8:
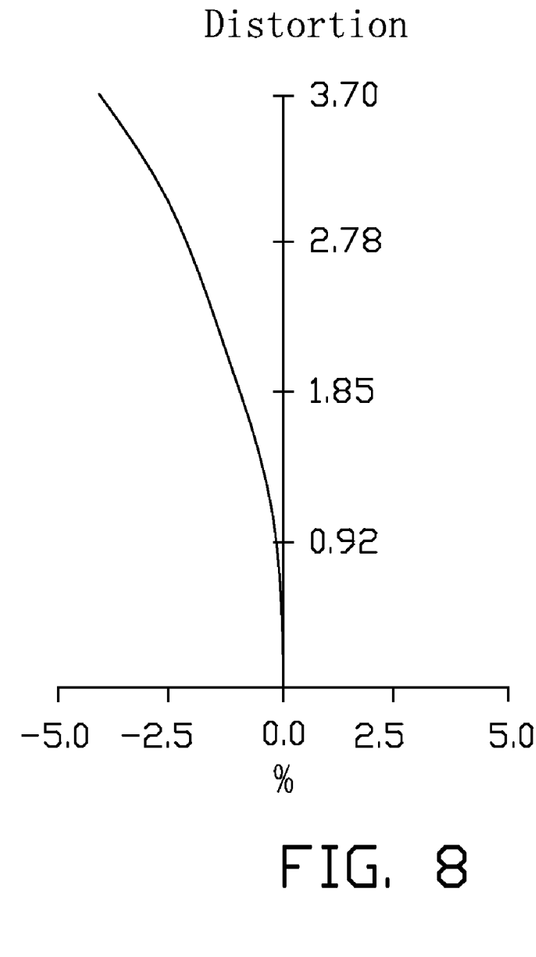

FIGS. 3-6 are graphs of aberrations (field curvature, distortion, chromatic aberration, and spherical aberration) of the zoom lens system 100 at the wide-angle position in the example. In FIG. 5, the wavelength of the long wave is 656.3 nm, and the wavelength of the short wave is 435.8 nm. In FIG. 6, the curves c, d, and f show spherical aberrations of the zoom lens system 100 corresponding to three light wavelengths of 656.3 nm, 587.6 nm, and 435.8 nm respectively. Generally, the field curvature of the zoom lens system 100 at the wide-angle position is limited to a range from about −0.1 mm to about 0.1 mm, the distortion of the zoom lens system 100 at the wide-angle position is limited to a range from about −5% to about 5%, the chromatic aberration of the zoom lens system 100 at the wide-angle position is limited to a range from about −0.003 nm to about 0.004 nm, and the spherical aberration of the zoom lens system 100 at the wide-angle position is limited to a range from about −0.5 nm to about 0.5 nm.

Figure 9:
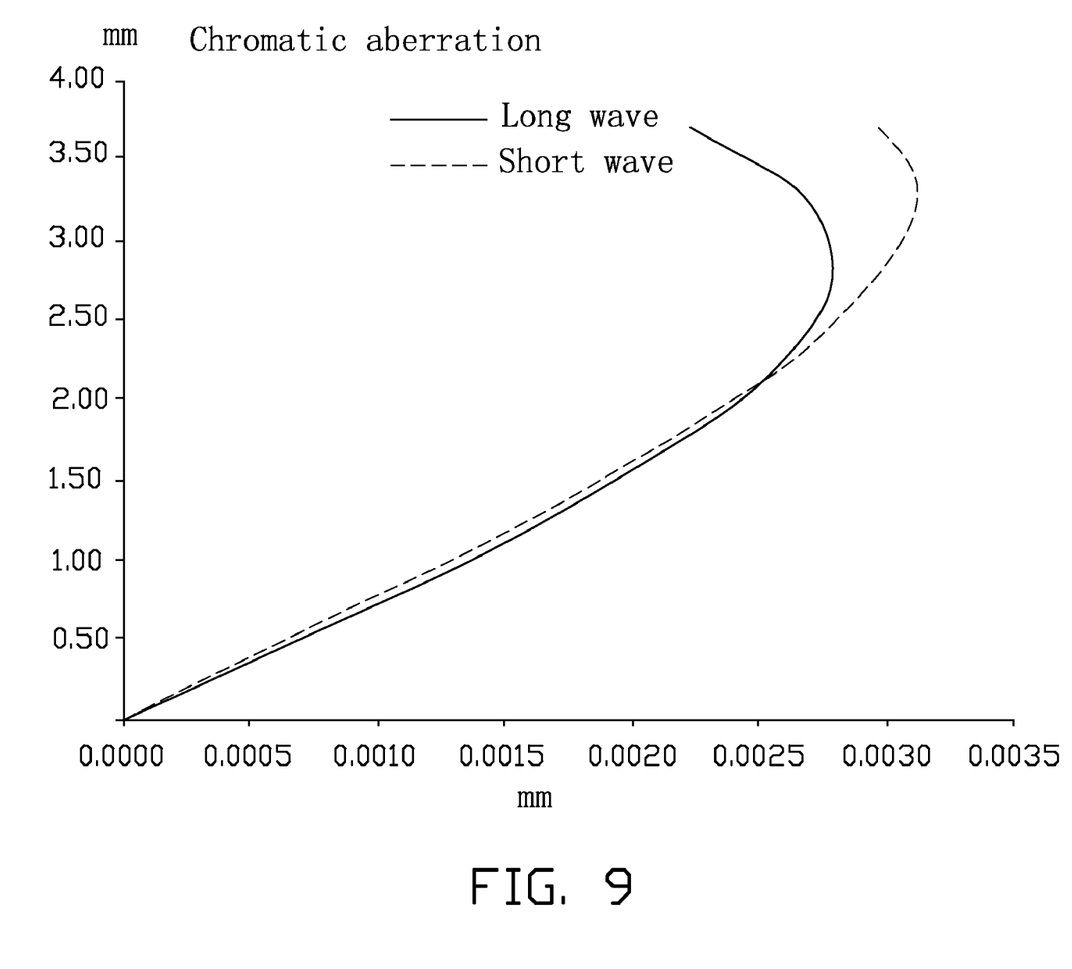
Figure 10:
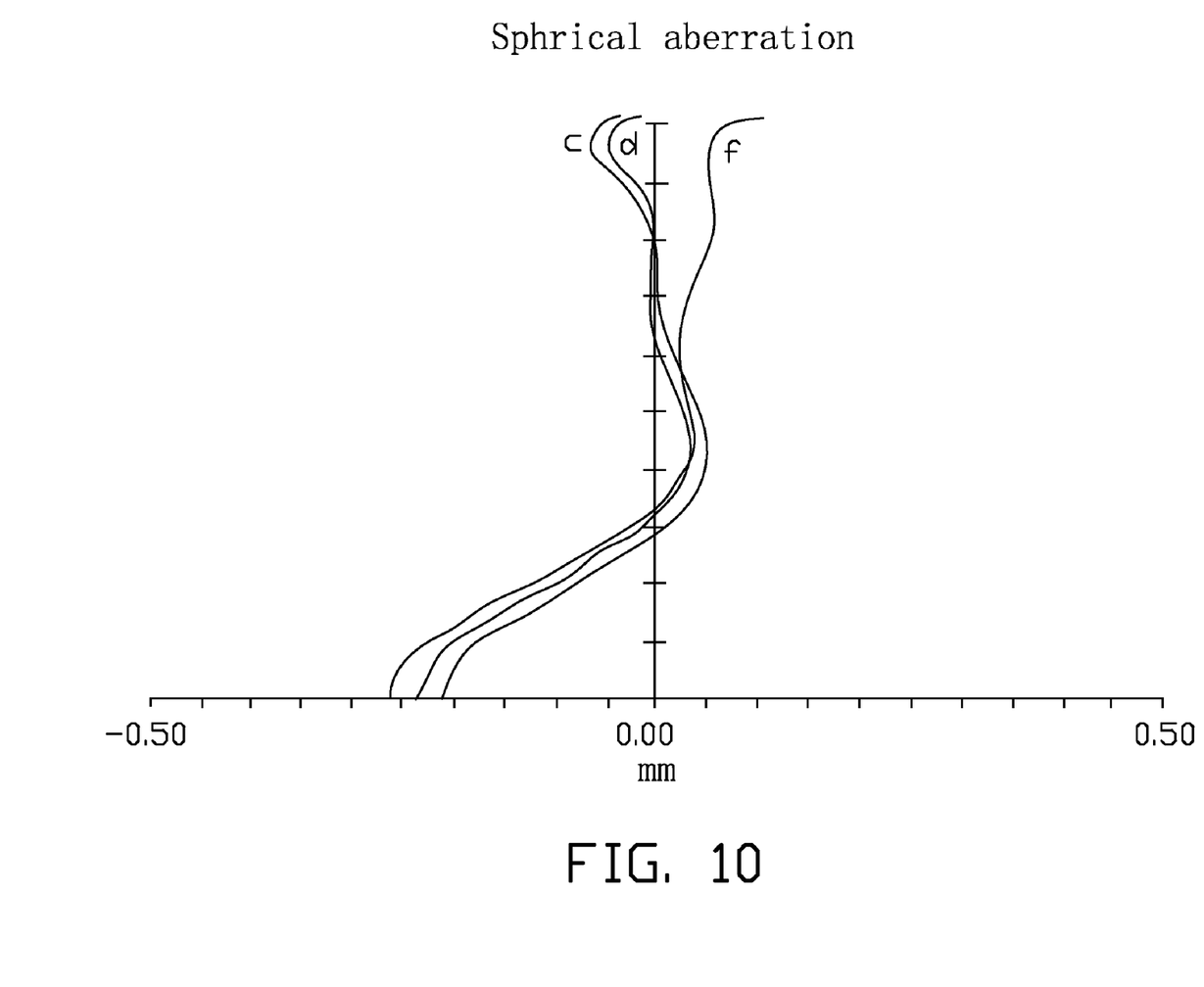

FIGS. 7-10 are graphs of aberrations (field curvature, distortion, chromatic aberration, and spherical aberration) of the zoom lens system 100 at the telephoto position in the example. In FIG. 9, the wavelength of the long wave is 656.3 nm, and the wavelength of the short wave is 435.8 nm. In FIG. 10, the curves c, d, and f show spherical aberrations of the zoom lens system 100 corresponding to three light wavelengths of 656.3 nm, 587.6 nm, and 435.8 nm respectively. Generally, the field curvature of the zoom lens system 100 at the telephoto position is limited to a range from about −0.1 mm to about 0.1 mm, the distortion of the zoom lens system 100 at the telephoto position is limited to a range from about −5% to about 5%, the chromatic aberration of the zoom lens system 100 at the telephoto position is limited to a range from about 0 nm to about 0.0035 nm, and the spherical aberration of the zoom lens system 100 at the telephoto position is limited to a range from about −0.5 nm to about 0.5 nm.

As seen in the above-described example, the field curvature, the distortion, the chromatic aberration, and the spherical aberration of the zoom lens system 100 at both the wide-angle position and the telephoto position are appropriately corrected. Therefore, the zoom lens system 100 can have an excellent optical performance.

While certain embodiments have been described and exemplified above, various other embodiments will be apparent to those skilled in the art from the foregoing disclosure. The present disclosure is not limited to the particular embodiments described and exemplified, and the embodiments are capable of considerable variation and modification without departure from the scope of the appended claims.

What is claimed is:

1. A zoom lens system comprising, in order from the object side:

a first lens group having negative refractive power, the first lens group comprising, in order from the object side to the image side, a first lens having negative refractive power and a second lens having positive refractive power;

a second lens group having positive refractive power, the second lens group comprising, in order from the object side to the image side, a third lens having positive refractive power, a fourth lens having negative refractive power, and a fifth lens having negative refractive power; and a third lens group having positive refractive power, the third lens group comprising a sixth lens having positive refractive power, wherein the zoom lens system satisfies the following conditions:

$ND3 > 1.8;$ (1)

$(ND3 - ND4) < 0.1;$ (2)

$TTL/fw <= 1.3;$ and (3)

$R6/fw > 0.70,$ (4)

wherein, ND3 is the refractive index of the third lens, ND4 is the refractive index of the fourth lens, TTL is the sum of the thickness of the first lens group, the thickness of the second lens group, and the thickness of the third lens group, fw is a focal length of the zoom lens system at a wide-angle position, R6 is the radius of curvature of a surface of the third lens facing the object side of the zoom lens system.

2. The zoom lens system as claimed in claim 1, wherein the following condition is further satisfied: (5) $10.5 < (V3-V4) < 11$, wherein, V3 is the Abbe constant of the third lens, V4 is the Abbe constant of the fourth lens.

3. The zoom lens system as claimed in claim 1, wherein the zoom lens system is used in digital cameras, mobile phones, or personal computer cameras.

4. The zoom lens system as claimed in claim 1, wherein the third lens and the fourth lens are cemented to form a cemented lens.

5. The zoom lens system as claimed in claim 1, wherein the zoom lens system further comprises an aperture stop arranged between the first lens group and the second lens group.

6. The zoom lens system as claimed in claim 5, wherein the aperture stop is fixed relative to the second lens group to be moved together with the second lens group.

7. The zoom lens system as claimed in claim 6, wherein the aperture stop is formed directly on the surface of the third lens of the second lens group facing the object side of the zoom lens system.

8. The zoom lens system as claimed in claim 7, wherein the aperture stop is formed by coating a peripheral portion of the surface of the third lens using an opaque material.

9. The zoom lens system as claimed in claim 1, wherein the zoom lens system further comprises an infrared filter arranged between the third lens group and an image plane of the zoom lens system.

10. The zoom lens system as claimed in claim 1, wherein the first lens, the third lens, the fourth lens, and the sixth lens are made of glass.

11. The zoom lens system as claimed in claim 1, wherein the second lens and the fifth lens are made from resin or plastic.

12. The zoom lens system as claimed in claim 1, wherein each of the second lens and the fifth lens is an aspherical lens.

13. A zoom lens system comprising, in order from the object side:
a first lens group having negative refractive power;
a second lens group having positive refractive power, the second lens group comprising, in order from the object side to the image side, a third lens having positive refractive power, a fourth lens having negative refractive power, and a fifth lens having negative refractive power; and
a third lens group having positive refractive power,
wherein the zoom lens system satisfies the following conditions:

$$ND3 > 1.8; \quad (1)$$

$$(ND3 - ND4) < 0.1; \quad (2)$$

$$TTL/fw <= 1.3; \text{ and} \quad (3)$$

$$R6/fw > 0.70, \quad (4)$$

wherein, ND3 is the refractive index of the third lens, ND4 is the refractive index of the fourth lens, TTL is the sum of the thickness of the first lens group, the thickness of the second lens group, and the thickness of the third lens group, fw is a focal length of the zoom lens system at a wide-angle position, R6 is the radius of curvature of a surface of the third lens facing the object side of the zoom lens system.

14. The zoom lens system as claimed in claim 13, wherein the following condition is further satisfied: (5) $10.5 < (V3 - V4) < 11$, wherein, V3 is the Abbe constant of the third lens, V4 is the Abbe constant of the fourth lens.

15. The zoom lens system as claimed in claim 13, wherein the zoom lens system is used in digital cameras, mobile phones, or personal computer cameras.

16. The zoom lens system as claimed in claim 13, wherein the third lens and the fourth lens are cemented to form a cemented lens.

17. The zoom lens system as claimed in claim 13, wherein the zoom lens system further comprises an aperture stop arranged between the first lens group and the second lens group.

18. The zoom lens system as claimed in claim 17, wherein the aperture stop is fixed relative to the second lens group to be moved together with the second lens group.

19. The zoom lens system as claimed in claim 18, wherein the aperture stop is formed directly on the surface of the third lens of the second lens group facing the object side of the zoom lens system.

20. The zoom lens system as claimed in claim 19, wherein the aperture stop is formed by coating a peripheral portion of the surface of the third lens using an opaque material.

* * * * *